(12) United States Patent
Kaku et al.

(10) Patent No.: US 6,282,246 B1
(45) Date of Patent: *Aug. 28, 2001

(54) FREQUENCY MODULATION METHOD AND MODEM UNIT EMPLOYING SUCH METHOD

(75) Inventors: Takashi Kaku; Ryoji Okita, both of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/956,553

(22) Filed: Oct. 23, 1997

(30) Foreign Application Priority Data

Mar. 6, 1997 (JP) .................................................... 9-052087

(51) Int. Cl.$^7$ .................................................... H04L 27/10
(52) U.S. Cl. .................................................... 375/275; 375/303
(58) Field of Search .................................... 375/223, 272, 375/275, 303; 332/100, 102; 455/59

(56) References Cited

U.S. PATENT DOCUMENTS

| 4,694,471 | 9/1987 | Blesser . | |
|---|---|---|---|
| 5,553,076 | * 9/1996 | Behtash et al. | 370/311 |
| 5,633,893 | * 5/1997 | Lampe et al. | 375/297 |
| 5,692,013 | * 11/1997 | Koslov et al. | 375/277 |

FOREIGN PATENT DOCUMENTS

| 2 201 867 | 9/1988 | (GB) . |
|---|---|---|
| 2 240 014 | 7/1991 | (GB) . |

* cited by examiner

*Primary Examiner*—Chi Pham
*Assistant Examiner*—Phuong Phu
(74) *Attorney, Agent, or Firm*—Helfgott & Karas, P.C.

(57) ABSTRACT

A frequency modulation method and modem unit for a frequency modulation using a common filter which uses a large number of carrier frequencies include a frequency-shifting unit for subjecting an input data to a frequency shift corresponding to a binary data value, a filter for limiting an output obtained by the frequency-shifting unit to a common band, and a modulation unit for frequency-modulating an output obtained by the filter, by a carrier frequency having an intermediate value of the frequencies respectively corresponding to the binary data values.

20 Claims, 13 Drawing Sheets

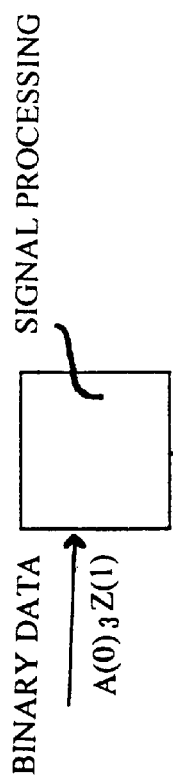
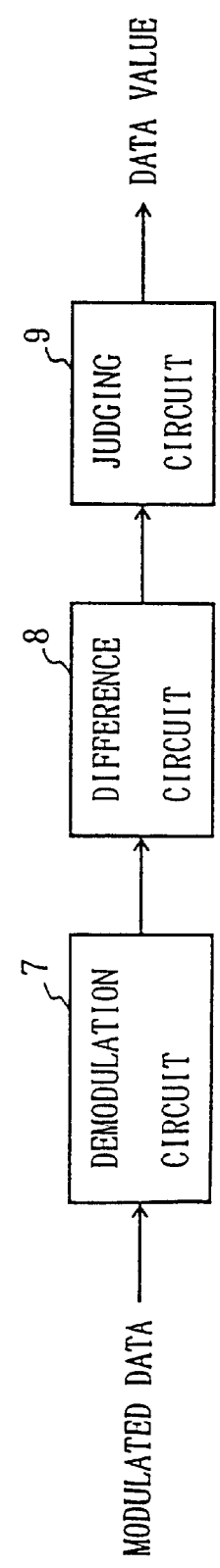

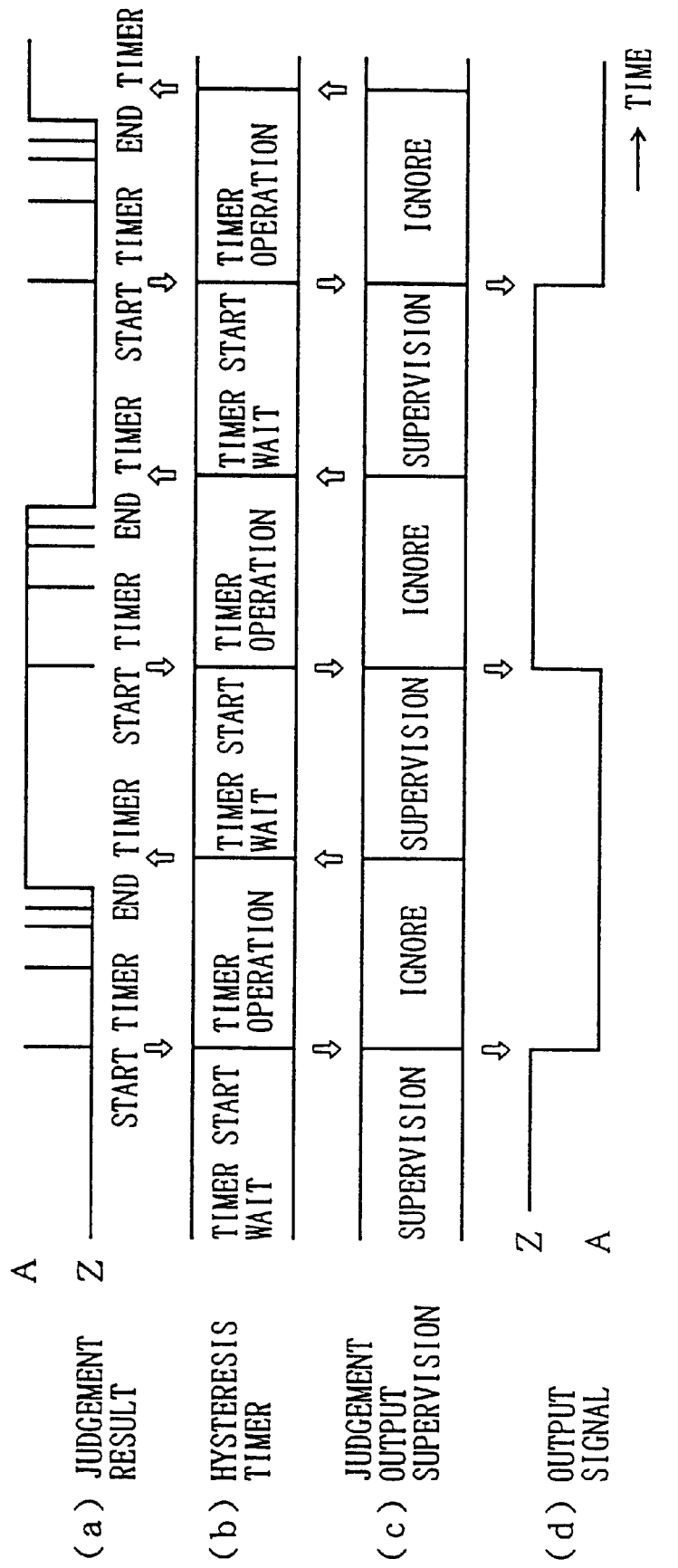

FREQUENCY MODULATION METHOD AND MODEM UNIT EMPLOYING SUCH METHOD

BACKGROUND OF THE INVENTION

1. Field of the Invention

The present invention generally relates to frequency modulation methods and modem units, and more particularly to a frequency modulation method which carries out a frequency modulation using a common filter with respect to a mode which uses a large number of carrier frequencies, and to a modem unit which employs such a frequency modulation method.

2. Description of the Prior Art

Conventionally, various kinds of modem units which employ the frequency modulation technique have been proposed. When using a plurality of carrier frequencies, a modem unit on the transmitting end must be provided with a filter for each of the carrier frequencies. On the other hand, a modem unit on the receiving end must be provided with bandpass filters having passbands for passing the frequencies corresponding to the original binary data values. The original binary data values are judged depending on the existence of outputs of the bandpass filters.

However, when a number of filters corresponding to the plurality of carrier frequencies are provided, the load on the modem design increases, and there were problems in that the construction of the modem unit becomes complex and the modem unit cannot be manufactured at low cost.

On the other hand, in order to judge the data by a digital signal processing by subjecting the received data to an analog-to-digital conversion, it is necessary to use a bandpass filter having a narrow band. But in order to realize the bandpass filter having the narrow band, it is inevitably necessary to set the number of taps of the bandpass filter to a large value, so as to satisfy a sufficient blocking characteristic. As a result, there were also problems in that the amount of computation processes and delays in the bandpass filter become large, and that it is difficult to improve the performance of the modem unit.

SUMMARY OF THE INVENTION

Accordingly, it is an object of the present invention to provide a frequency modulation method which can suppress the increase of the delays by using a simple and inexpensive structure and making the amount of signal processing relatively small, and to provide a modem unit employing such a frequency modulation method.

This and other objects of the present invention are attained by a frequency modulation method comprising a frequency-shifting step for subjecting an input data to a frequency shift corresponding to a binary data value; a filtering step for filtering an output obtained by said frequency-shifting step so as to limit said output to a common band; and a modulation step for frequency-modulating an output obtained by said filtering step by a carrier frequency having an intermediate value of the frequencies respectively corresponding to the binary data values ("1" and "0" and defined by FSK modulation).

In the frequency modulation method of the present invention, the input data may be subjected in the frequency-shifting step to the frequency shift with a frequency shifting quantity corresponding to the maximum data transmission rate.

An unwanted band may be limited in the filtering step corresponding to a data transmission rate.

The frequency modulation method of the present invention may further comprise a step for limiting the input data within a frequency band of a transmission medium through which frequency modulated data obtained by the modulation step is transmitted, before the frequency-shifting step.

The frequency modulation method of the present invention may further comprise a step for automatically setting parameters used in at least the frequency-shifting step and the filtering step depending on a data transmission rate.

The objects of the present invention are also attained by a modem unit comprising frequency-shifting means for subjecting an input data to a frequency shift corresponding to a binary data value; filtering means for limiting an output obtained by said frequency-shifting means to a common band; and modulation means for frequency-modulating an output value obtained by said filtering means by a carrier frequency having an intermediate value of the frequencies respectively corresponding to the binary data values ("1" and "0" and defined by FSK modulation).

The frequency-shifting means may subject the input data to the frequency shift with a frequency shift quantity corresponding to a frequency difference of corresponding binary data values.

In the modem unit of the present invention, the filtering means may limit an unwanted band corresponding to a data transmission rate.

The modem unit of the present invention may further comprise means for limiting the input data within a frequency band of a transmission medium through which frequency modulated data obtained by the modulation means is transmitted, at a stage before the frequency-shifting means.

According to the invention, the modem unit may further comprise means for automatically setting parameters used in at least the frequency-shifting means and the filtering means depending on a data transmission rate.

The objects of the present invention can also be realized by a modem unit comprising demodulation means for demodulating a frequency modulated data, which is obtained by frequency-modulating an input data, by a carrier frequency having an intermediate value of the frequencies respectively corresponding to the binary data values; means for obtaining a phase shift quantity from a phase difference of vector signals of a baseband obtained from said demodulation means; and judging means for judging a binary data value from the input data based on the phase shift quantity obtained by said means for obtaining a phase shift quantity.

According to the present invention, the means for obtaining a phase shift quantity may include means for normalizing the vector signals of the baseband obtained from the demodulation means.

According to the present invention, the judging means of the modem unit may include first means for judging the binary data value of said input data based on a polarity of the phase shift quantity.

The judging means of the modem unit may further include second means for holding a judgement result of the binary data value corresponding to the polarity for a predetermined holding time after said first means judges the polarity of the phase shift quantity.

According to the present invention, the modem unit may further comprise means for holding the binary data value when the carrier is OFF.

The construction of a transmitting system of the modem unit of the present invention is simple and the modem unit can be manufactured at low cost, because a common band limiting operation is carried out by common filter means even if a large number of carrier frequencies are used.

The frequency-shifting means may be a circuit which subjects the input data to the frequency shift and has a relatively simple construction, and the amount of computation processes carried out is relatively small.

It is possible to use a common filter means with respect to each carrier to suit the data transmission rate.

It is also possible to carry out an optimum signal processing with respect to the transmission medium used for the data transmission in the step for limiting the input data within a frequency band of a transmission medium through which frequency obtained by the modulation step is transmitted, before the frequency-shifting step.

It is possible to carry out the frequency modulation to suit the data transmission rate using the same circuit construction due to automatically setting parameters used in at least the frequency-shifting step and the filtering step depending on a data transmission rate.

The amount of signal processing in the receiving system is relatively small because the frequency change in the vector signal of the baseband obtained from the demodulation means is obtained from the phase shift quantity based on the phase difference. In addition, it is possible to accurately demodulate the frequency modulated data because the delay quantity does not become large.

By providing means for normalizing the vector signals in the means for obtaining a phase shift quantity it is possible to obtain an accurate phase shift quantity regardless of the data transmission rate, by obtaining the phase shift quantity from the vector signal of the normalized baseband.

It is possible to accurately judge the binary data value of the input data using a simple circuit construction because the judging means includes means for judging the binary data value of the input data based on a polarity of the phase shift quantity.

It is also possible to prevent chattering when judging the binary data value.

Due to the present invention, it is possible to prevent an erroneous operation of an external unit or the like, by preventing so-called unwanted or trash data from being output.

Accordingly, due to the present invention, the construction of a transmitting system of the modem unit becomes simple and the modem unit can be manufactured at low cost, because a common band limiting operation is carried out by a common filter means even if a large number of carrier frequencies are used. In addition, the amount of signal processing in the receiving system is relatively small because the frequency change in the vector signal of the baseband obtained from the demoduation means is obtained from the phase shift quantity based on the phase difference. Further, it is possible to accurately demodulate the frequency modulated data because the delay quantity does not become large.

BRIEF DESCRIPTION OF THE DRAWINGS

FIGS. 1A and 1B are diagrams for explaining the operating principle of the present invention where FIG. 1A shows a transmitting system and FIG. 1B shows a receiving system of a modem unit of the present invention;

FIG. 16 is a time chart for explaining the operation of the judging circuit.

DETAILED DESCRIPTION OF THE PREFERRED EMBODIMENTS

Figure 2:
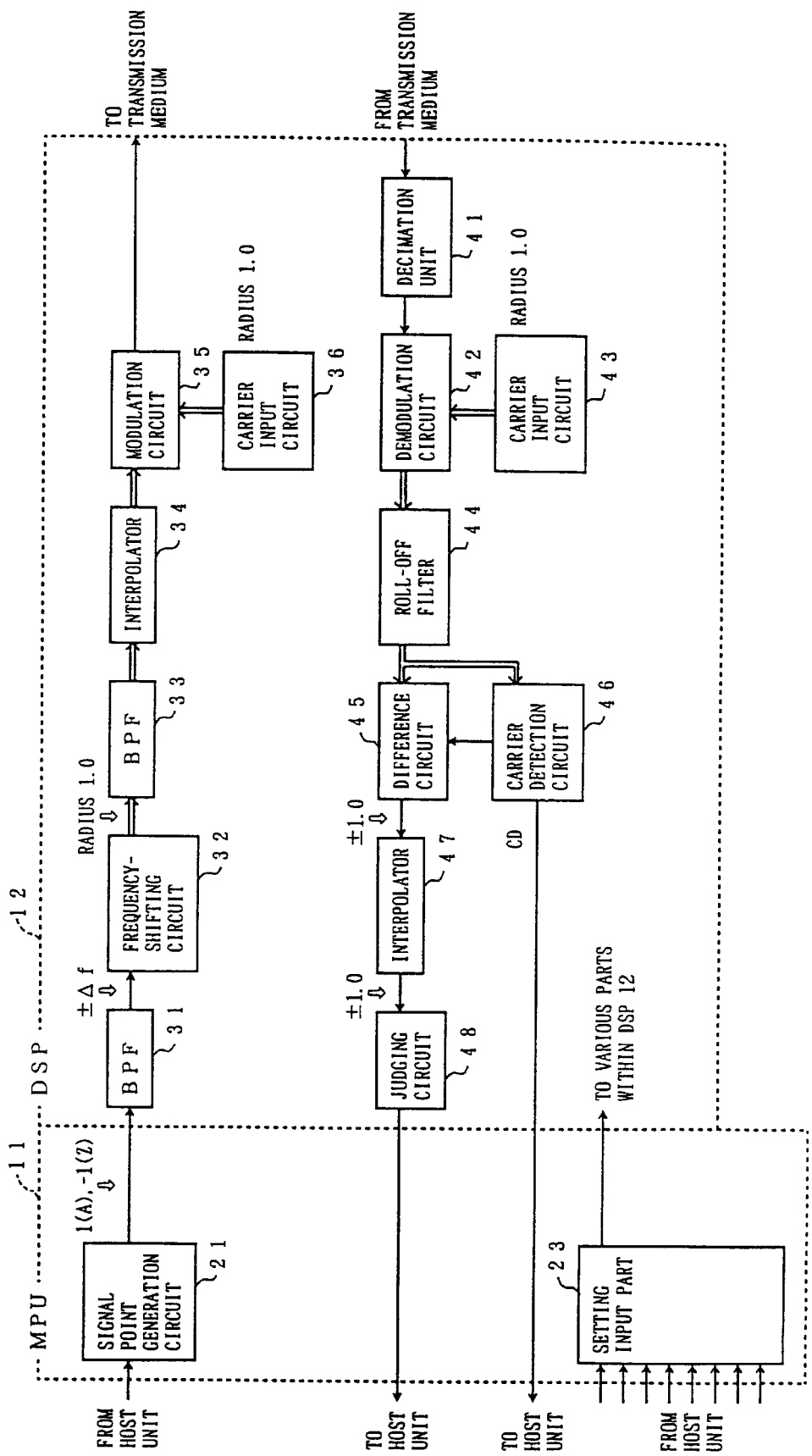
FIG. 2 is a block diagram showing an embodiment of a modem unit according to the present invention.

Referring now to the drawings in detail, FIGS. 1A and 1B show diagrams for explaining the operating principle of the present invention; FIG. 1A shows a transmitting system of a modem unit, and FIG. 1B shows a receiving system of the modem unit.

In the transmitting system shown in FIG. 1A binary data A(0) and Z(1) are converted into signal points 1(A) and −1(Z), and are input to a frequency-shifting circuit 1 after being subjected to a signal processing such as a band limiting operation if necessary. The frequency-shifting circuit 1 subjects the input data to a frequency shift corresponding to the binary data value. A bandpass filter 2 subjects an output of the frequency-shifting circuit 1 to a common band limiting operation. A modulation circuit 3 frequency-modulates an output of the bandpass filter 2 by a carrier frequency having an intermediate value of the frequencies respectively corresponding to the binary data values ("1" and "0" and defined by FSK modulation). A frequency modulated data output from the modulation circuit 3 is subjected to a signal processing if necessary and is transmitted to a transmission medium.

On the other hand, in the receiving system shown in FIG. 1B, the frequency modulated data received via the transmission medium is subjected to a signal processing if necessary and is input to a demodulated circuit 7. The demodulation circuit 7 demodulates the frequency modulated data by a carrier frequency having an intermediate value of the binary data value. A frequency change or difference obtaining circuit 8 (called "difference circuit" thereafter) obtains a frequency change in a vector signal of a baseband obtained from the demodulation circuit 7, from a phase shift quantity based on a phase difference. A judging circuit 9 judges the binary data value of the binary input data based on the frequency change obtained from the difference circuit 8.

According to the present invention, the construction of the transmitting system of the modem unit becomes simple and the modem unit can be manufactured at low cost, because a common band limiting operation is carried out by the common filter 2 even if a large number of carrier frequencies are used. In addition, the amount of signal processing in the receiving system is relatively small because the frequency change in the vector signal of the baseband obtained from the demodulation circuit 7 is obtained from the phase shift quantity based on the phase difference. Further, it is possible to accurately demodulate the frequency modulated data because the delay quantity does not become large.

FIG. 2 is a block diagram showing an embodiment of the modem unit according to the present invention. This embodiment of the modem unit employs an embodiment of a frequency modulation method according to the present invention.

In FIG. 2, the modem unit generally includes a microprocessor unit (MPU) 11 and a digital signal processor (DSP) 12. The MPU 11 includes a signal point generation circuit 21 and a setting input part 23. On the other hand, the DSP 12 includes a transmitting system and a receiving system. The transmitting system includes a first bandpass filter 31, a frequency-shifting circuit 32, a second bandpass filter 33, an interpolator 34, a modulation circuit 35 and a carrier input circuit 36. The receiving system includes a decimation unit 41, a demodulation circuit 42, a carrier input circuit 43, a roll-off filter 44, a frequency change or difference obtaining circuit 45, (later called difference circuit) a carrier detection circuit 46, an interpolator 47 and a judging circuit 48. In FIG. 2 and equivalent circuit diagrams and block diagrams which will be described later, a signal line indicated by a single-real line indicates a scalar signal line, and a signal line indicated by a double-real line indicates a vector signal line.

First, a description will be given of the transmitting system of the modem unit.

Input binary data A(0) and Z(1) and a mode setting signal which are input to the modem unit from a host unit (not shown), for example, are input to the signal point generation circuit 21 and the setting input part 23 within the MPU 11. The input binary data A(0) and Z(1) are converted into signal points 1(A) and −1(Z) by the signal point generation circuit 21 within the MPU 11, and input to the first bandpass filter 31 within the DSP 12. The first bandpass filter 31 is provided to limit the signal frequency band to within a frequency band of a transmission medium through which a frequency modulated data is to be transmitted. Since a maximum band is required when the transmission rate used is a maximum, the characteristic of the first bandpass filter 31 is set depending on the maximum transmission rate.

The mode setting signal sets the mode of the modem unit, that is, the maximum transmission rate. In this embodiment, it is assumed for the sake of convenience that the modem unit has four modes respectively corresponding to the transmission rates of 200 bps, 300 bps, 600 bps and 1200 bps. Based on the mode setting signal, the setting input part 23 generates and outputs control signals or the like for controlling various parts within the DSP 12 depending on the set mode. In FIG. 2, only a portion of the control signal lines from the setting input part 23 to the various parts within the DSP 12 is shown to simplify the drawing.

Figure 3:
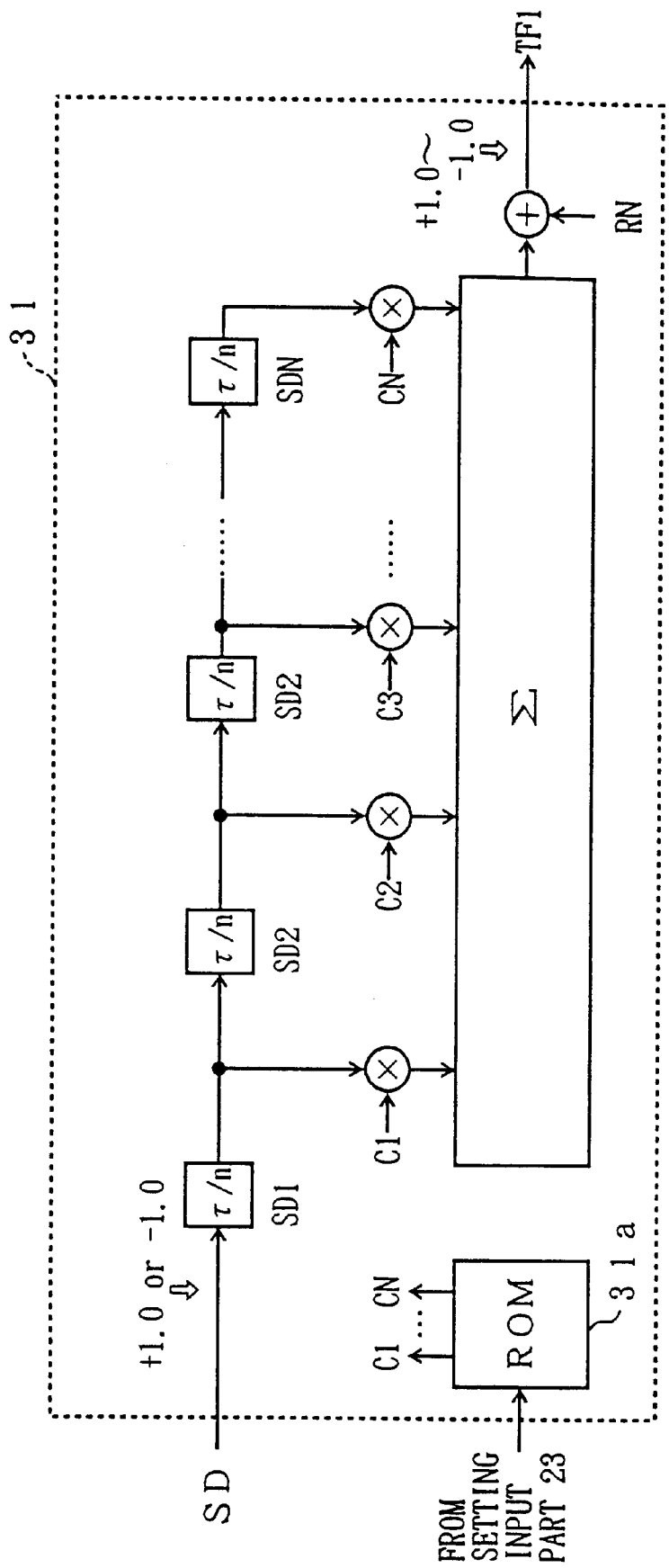
FIG. 3 is an equivalent circuit diagram of a first bandpass filter.

FIG. 3 is an equivalent circuit diagram of the first bandpass filter 31. In FIG. 3, "τ/n" indicate delays corresponding to the sampling time, "×" indicates multiplication, "Σ" and "+" indicate additions, and an addition "+" input with RN indicates a rounding by a coefficient RN. In addition, SD denotes the input binary data, SD1 through SDN denote delayed binary data, C1 through CN denote multiplying coefficients, and TF1 denotes an output of the first bandpass filter 31. For example, a number taps N is 21. The multiplying coefficients C1 through CN are read from a ROM 31a based on a control signal which is input from the setting input part 23 within the MPU 11 shown in FIG. 2 depending on the mode setting signal. The multiplying coefficients C1 through CN may be input directly from the setting input part 23 depending on the mode setting signal.

Figure 4:
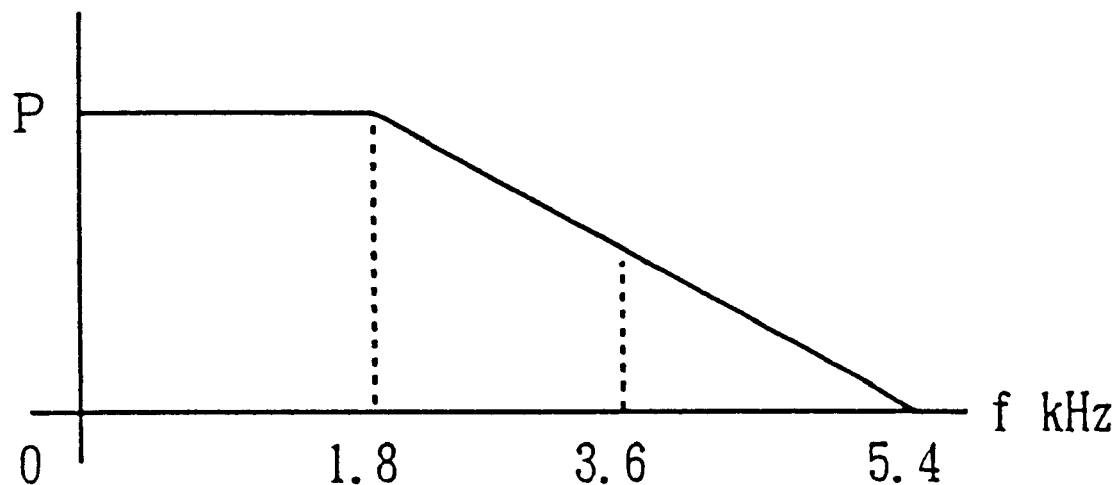
FIG. 4 is a diagram showing the characteristic of the first bandpass filter of FIG. 3.

FIG. 4 is a diagram showing the characteristic of the first bandpass filter 31. In FIG. 4, the ordinate indicates an amplitude spectrum P in arbitrary units, and the abscissa indicates a frequency f in kHz. For the sake of convenience, it is assumed that the sampling frequency of the input binary data is 28.8 kHz and the maximum transmission rate is 1200 bps (fourth mode). In order to secure a band which is uneasily affected by a code error and to reduce the amount of computations, the first bandpass filter 31 converts the sampling frequency from 28.8 kHz to 7.2 kHz by a ¼ decimation, and carries out the filter calculation every fourth times. When making this conversion, the characteristic of the first bandpass filter 31 is set so as to include no attenuation up to 1.8 kHz as shown in FIG. 4, so as to avoid the band that is used from being affected by an aliasing component.

The output of the first bandpass filter 31 is subjected to a frequency shift of $\pm \Delta f$ depending on the data values A and Z of the input binary data A(0) and Z(1) by the frequency-shifting circuit 32. For example, if the maximum transmission rate is 1200 bps (fourth mode) in conformance with the ITU Recommendations V.23, A=2100 Hz, Z=1300 Hz, the frequency shift quantity is ±400 Hz from a center (carrier) frequency of 1700 Hz, and the phase shift quantity at the sampling frequency of 7.2 kHz is 400 Hz×360°/7.2 kHz= 20°=0.34906585 radians. For this reason, a phase shift quantity θ in the frequency-shifting circuit 32 is −0.34906585 to +0.34906585 radians since the phase shift quantity at the sampling frequency of 7.2 kHz is multiplied with the output value of −1 to +1 of the first bandpass filter 31. This phase shift quantity θ is converted into vectors of cosine and sine and a phase sum is obtained for each sample, so that a signal having the frequency shift $\pm \Delta f$ of −400 Hz to +400 Hz is output from the frequency-shifting circuit 32.

Figure 5:
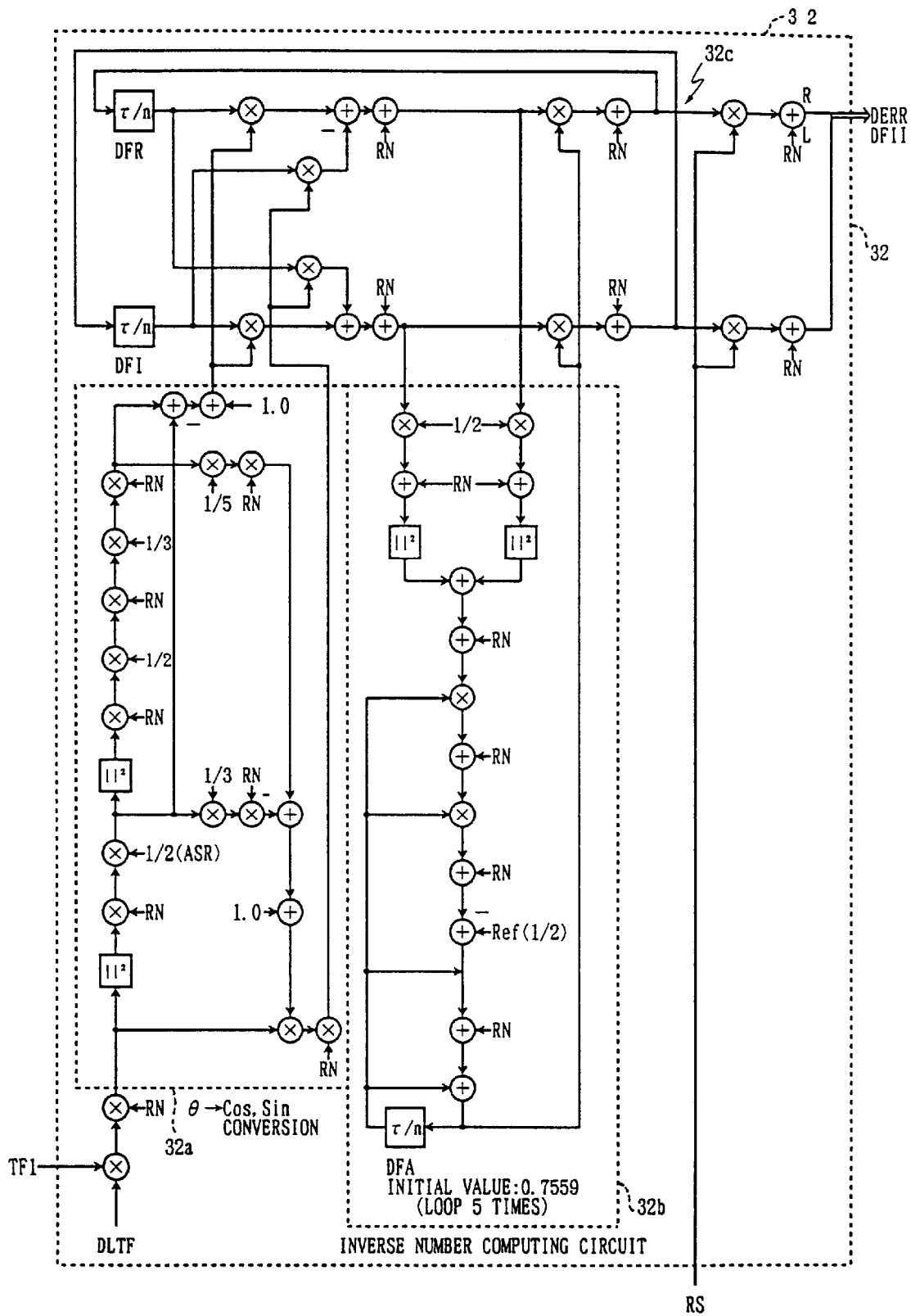
FIG. 5 is an equivalent circuit diagram of a frequency-shifting circuit of the modem unit of the present invention.

FIG. 5 is an equivalent circuit diagram of the frequency-shifting circuit 32. The frequency-shifting circuit 32 generally includes a converter 32a which converts the phase shift quantity θ into the vectors of cosine and sine, an inverse number computing unit 32b, and a computing unit 32c which carries out the computations independently with respect to the real and imaginary number portions for the vector operation. In FIG. 5, "τ/n" indicates a delay, "| |$^2$" indicates a square of an absolute value, "×" indicates multiplication, "+" indicates an addition, and "×" and "+" input with RN respectively indicate a rounding by a coefficient RN. In addition, DLTF denotes a signal in radians indicating the shift angle/sample (phase shift quantity). This signal DLTF may be input from the setting input part 23 within the MPU 11 shown in FIG. 2 depending on the mode setting signal or, as will be described later, may be generated within the frequency-shifting circuit 32 based on a control signal from the setting input part 23. In this embodiment, the signal DLTF is (frequency shift quantity)/(sampling frequency)×2π=±Δf/7.2 kHz×2π. DFRR indicates the real number portion and DFII indicates the imaginary number portion, and these portions DFRR and DFII are input to the second bandpass filter 33 which will be described later.

Figure 6:
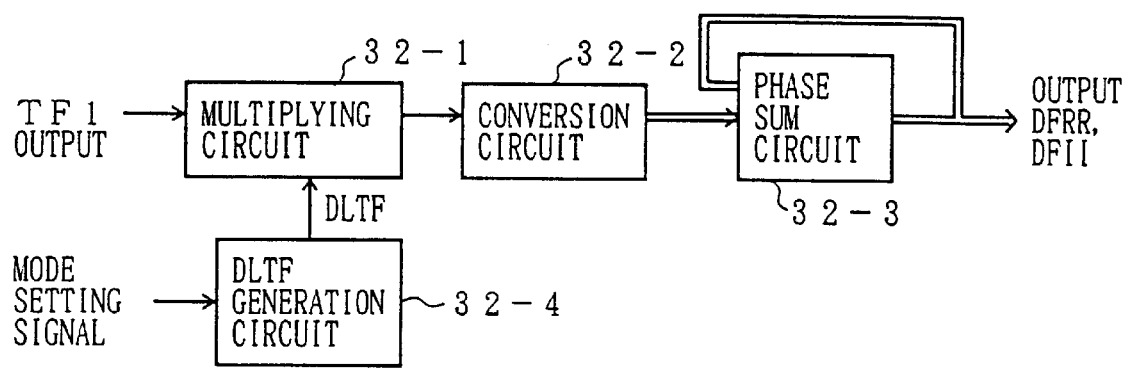
FIG. 6 is a block diagram showing the basic functions of the frequency-shifting circuit by simplifying the equivalent circuit of FIG. 5.

FIG. 6 is a block diagram showing the basic functions of the frequency-shifting circuit 32 by simplifying the equivalent circuit diagram of FIG. 5. As shown in FIG. 6, the frequency-shifting circuit 32 generally includes a multiplying circuit 32-1, a conversion circuit 32-2, a phase sum circuit 32-3, and a DLTF generation circuit 32-4. The multiplying circuit 32-1 multiplies the output TF1 of the first bandpass filter 31 and the signal DLTF which is generated by the DLTF generation circuit 32-4 based on the control signal from the setting input part 23 within the MPU 11 shown in FIG. 2 depending on the mode setting signal, and inputs a multiplication result to the conversion circuit 32-2. If the maximum transmission rate is 1200 bps, the sampling frequency is 7.2 kHz and the frequency shift $\pm\Delta f$ is $\pm 400$ Hz as described above, the signal DLTF is 0.34906585 radians.

In this embodiment, it is assumed that in the first, second, third and fourth modes respectively corresponding to the maximum transmission rates of 200 bps, 300 bps, 600 bps and 1200 bps, the sampling frequency is 7.2 kHz and is the same for the four modes, but the frequency shifts $\pm\Delta f$ of the four modes respectively are $\pm 100$ Hz, $\pm 100$ Hz, $\pm 200$ Hz and $\pm 400$ Hz.

The conversion circuit 32-2 converts the phase shift quantity $\theta$ into the vectors of cosine and sine, based on the multiplication result from the multiplying circuit 32-1. The conversion in this case can be made by computations based on the following series expansion.

$$\cos\theta = 1 - \theta^2/2! + \theta^4/4!$$

$$\sin\theta = \theta - \theta^3/3! + \theta^5/5!$$

Output vectors of the conversion circuit 32-2 are input to the phase sum circuit 32-3.

The phase sum circuit 32-3 obtains the phase sum DFRR and DFII by calculating the following trigonometric function formulas based on the output vectors of the conversion circuit 32-2.

$$DFRR = \cos(\theta_n + \theta_{n-1})$$
$$= \cos\theta_n \cos\theta_{n-1} - \sin\theta_n \sin\theta_{n-1}$$
$$DFII = \sin(\theta_n + \theta_{n-1})$$
$$= \sin\theta_n \sin\theta_{n-1} + \cos\theta_n \cos\theta_{n-1}$$

The phase sum DFRR and DFII output from the phase sum circuit 32-3 is input to the second bandpass filter 33.

The second bandpass filter 33 is provided to limit the unwanted band corresponding to each mode, that is, corresponding to each maximum transmission rate. When making a transmission using the frequency division multiplexing, the carrier frequencies may be different although the bandwidth is the same. For example, if it is assumed that the transmission using the frequency division multiplexing is made at the maximum transmission rate of 200 bps, the frequency shift $\pm\Delta f$ is $\pm 100$ Hz, and the carrier frequency is 800 Hz, 1200 Hz, 1600 Hz, 2000 Hz, 24000 Hz and 2800 Hz, it is necessary to set the characteristic of the second bandpass filter 33 so that there is no leak to an adjacent band. Furthermore, in order to obtain a bandwidth satisfying a performance such that the code error is within 15%, the characteristic of the second bandpass filter 33 must also be set so that the band up to $20\log_{10} 0.15 = -17$ dB is flat. Accordingly, since the second bandpass filter 33 carries out the process in the baseband prior to the modulation using the carrier frequency, the second bandpass filter 33 can be used in common with respect to each of the carrier frequencies.

Figure 7:
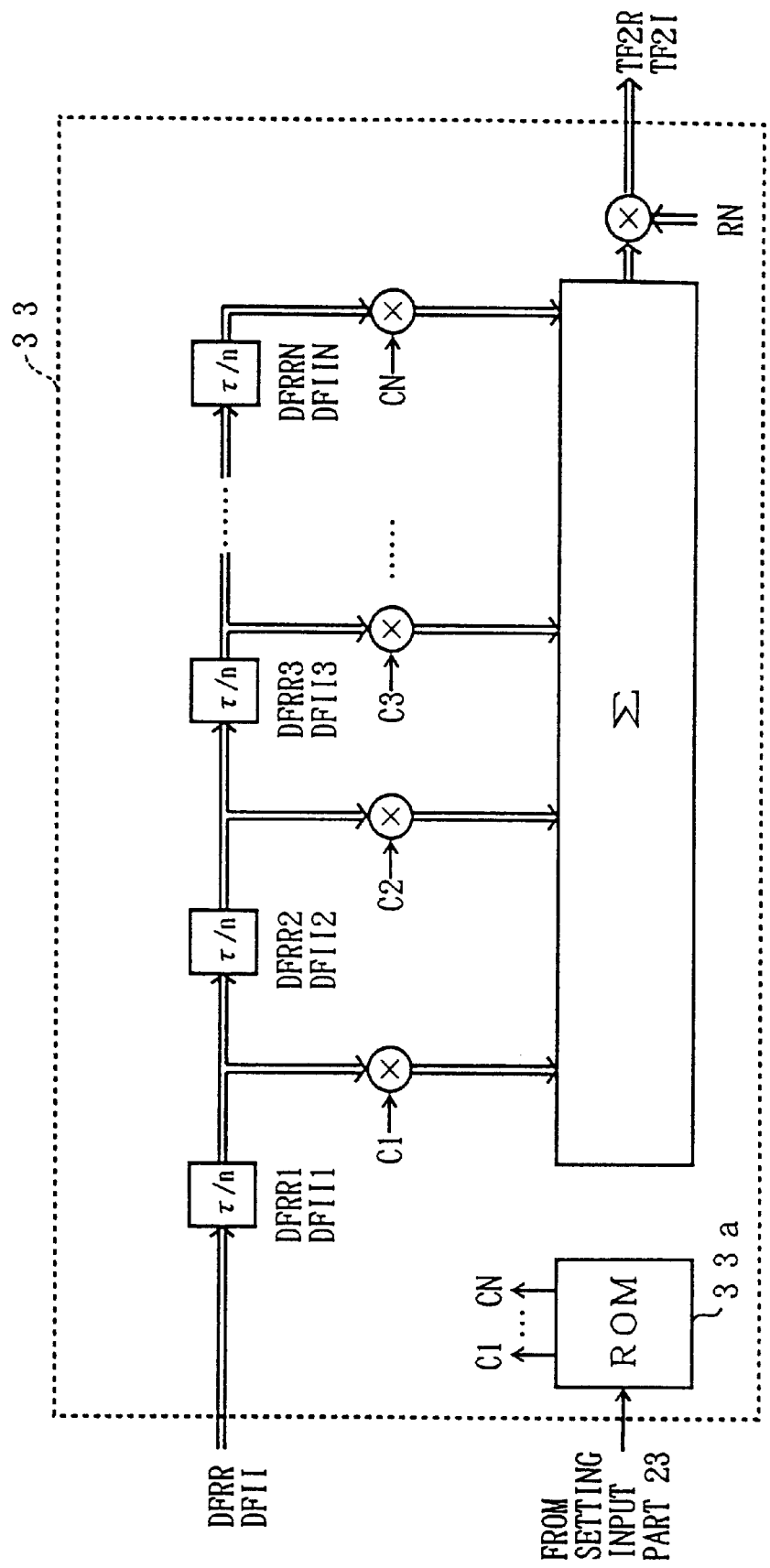
FIG. 7 is an equivalent circuit diagram of a second bandpass filter.

FIG. 7 is an equivalent circuit diagram of the second bandpass filter 33. In FIG. 7, "$\tau/n$" indicates a delay corresponding to the sampling time, "×" indicates multiplication, "$\Sigma$" and "+" indicate additions, and an addition "+" input with RN indicates a rounding by a coefficient RN. In addition, DFRR1 through DFRRN and DFII1 through DFIIN respectively denote the real and imaginary number portions of the delayed phase sum, C1 through CN denote multiplying coefficients (different from the multiplying coefficients shown in FIG. 3), and TF2R and TF2I respectively denote real and imaginary number portions of the output of the second bandpass filter 33. For example, in the case of the first mode in which the maximum transmission rate is 200 bps, the number of taps N is 91. The multiplying coefficients C1 through CN are read from a ROM 33a based on a control signal input from the setting input part 23 within the MPU 11 shown in FIG. 2 depending on the mode setting signal. The multiplying coefficients C1 through CN may be input directly from the setting input part 23 depending on the mode setting signal.

As may be seen from FIG. 7, the second bandpass filter 33 is basically a finite impulse response (FIR) filter described by the following transfer function.

$$H(z) = \sum_{k=0}^{N-1} C_k z^{-k}$$

FIGS. 8 through 11, respectively, are diagrams showing the characteristic of the second bandpass filter 33 in the first, second, third and fourth modes respectively corresponding to the maximum transmission rates of 200 bps, 300 bps, 600 bps and 1200 bps.

For example, in the case of the first mode, the multiplying coefficients C1 through CN of the second bandpass filter 33 are determined so as to satisfy the following conditions, and are stored in the ROM 33a.

(1) The frequency characteristic is flat up to the frequency shift of 100 Hz or higher, so that the characteristic becomes constant at the frequencies corresponding to the data A(0) and Z(1);

(2) The band is flat up to $20\log_{10} 0.15 = -17$ dB on the transmitting data spectrum, so that the code error is 15% or less;

(3) The energy to the adjacent channel is eliminated;

(4) A sufficiently large signal-to-noise (S/N) ratio is secured outside the band; and (5) The aliasing noise outside the band is taken into consideration.

Figure 8:
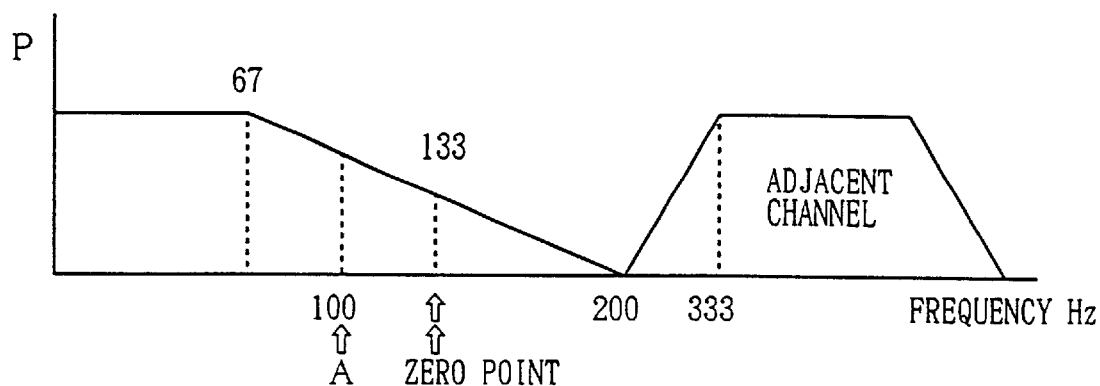
FIG. 8 is a diagram showing the characteristic of the second bandpass filter in a first mode.

Accordingly, the characteristic of the second bandpass filter 33 becomes as shown in FIG. 8 with respect to the first mode when the multiplying coefficients C1 through CN are determined so as to satisfy the above described conditions (1) through (5). In this case, the sampling frequency is 7.2 kHz, the baud rate is 267 bauds, the roll-off rate (ROF) is a 50.00% $\cos^2$ characteristic, and the number of taps is 91.

Figure 9:
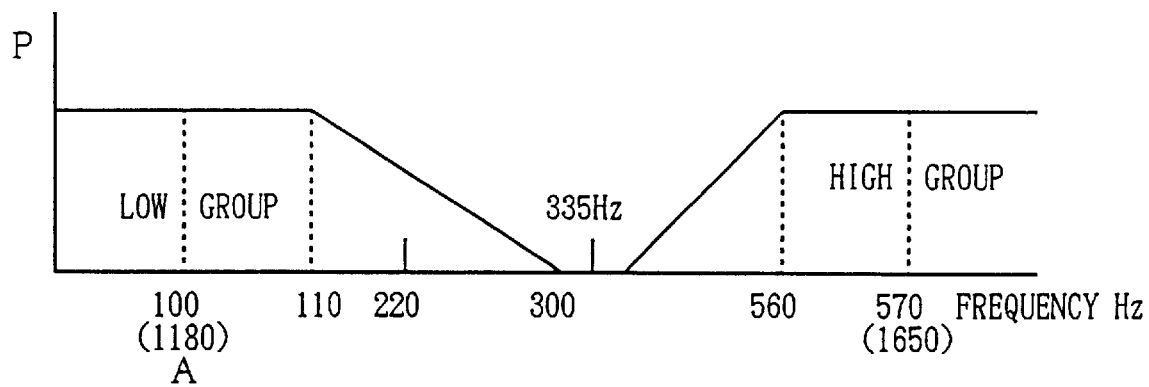
FIG. 9 is a diagram showing the characteristic of the second bandpass filter in a second mode.

Similarly, the characteristic of the second bandpass filter 33 becomes as shown in FIG. 9 with respect to the second mode when the multiplying coefficient C1 through CN are determined so as to satisfy the above described conditions (1) through (5). In this case, the sampling frequency is 7.2 kHz, the baud rate is 440 bauds, the ROF is a 50.00% $\cos^2$ characteristic, and the number of taps is 63.

Figure 10:
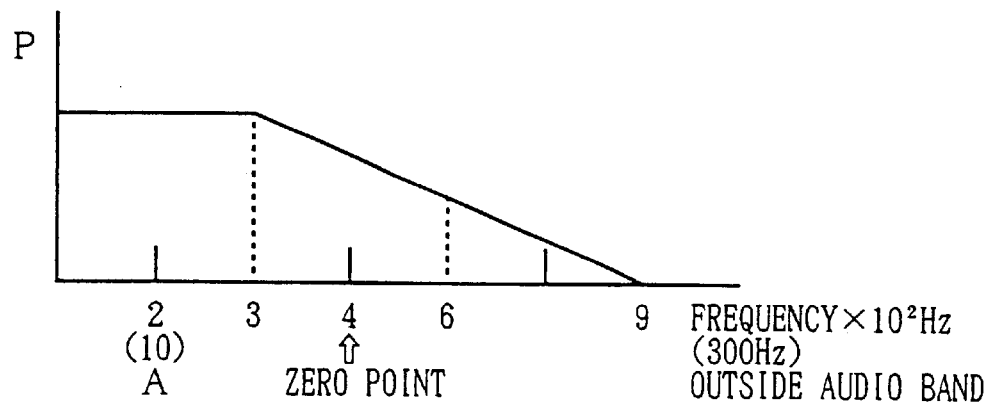
FIG. 10 is a diagram showing the characteristic of the second bandpass filter in a third mode.

The characteristic of the second bandpass filter 33 becomes as shown in FIG. 10 with respect to the third mode then the multiplying coefficients C1 through CN are determined so as to satisfy the above described conditions (1)

through (5). In this case, the sampling frequency is 7.2 kHz, the baud rate is 1200 bauds, the ROF is a 50.00% $\cos^2$ characteristic, and the number of taps is 25.

Figure 11:
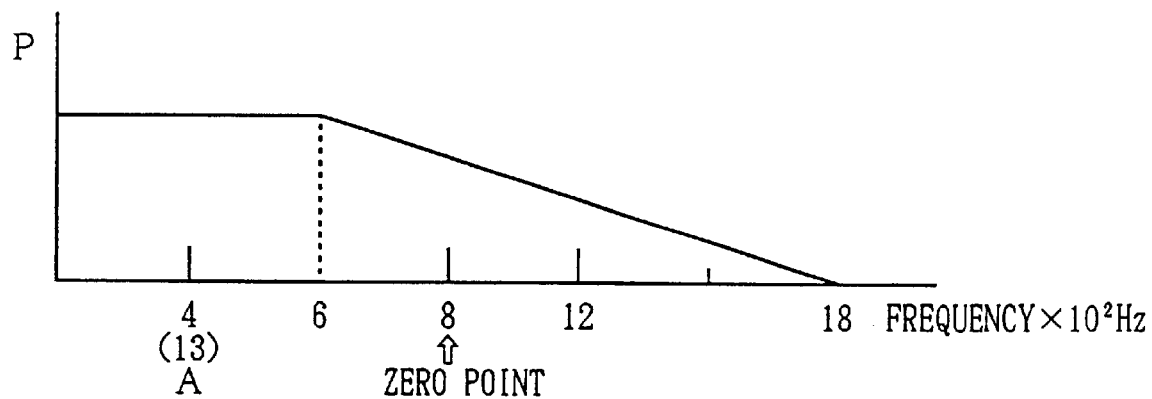
FIG. 11 is a diagram showing the characteristic of the second bandpass filter in a fourth mode.

Furthermore, the characteristic of the second bandpass filter 33 becomes as shown in FIG. 11 with respect to the fourth mode when the multiplying coefficients C1 through CN are determined so as to satisfy the above described conditions (1) through (5). In this case, the sampling frequency is 7.2 kHz, the baud rate is 2400 bauds, the ROF is a 50.00% $\cos^2$ characteristic, and the number of taps is 11.

The baseband output TF2R, TF2I which is band-limited by the second bandpass filter 33 is input to the modulation circuit 35 shown in FIG. 2 wherein the sampling frequency of 7.2 kHz is converted into 14.4 kHz and the baseband output is modulated by each carrier frequency from the carrier input circuit 36. The frequency modulated data output from the modulation circuit 35 is subjected to a predetermined signal processing if necessary and is output to a transmission medium (not shown). For example, the predetermined signal processing in the transmitting system is carried out in known circuits which carry out a frequency characteristic compensation, transmission level adjustment, loop test, digital-to-analog (D/A) conversion or the like, before outputting the frequency modulated data to a line which is used as the transmission medium. The frequency characteristic compensation circuit is provided to compensate for the frequency characteristic deterioration caused by the line. The loop test circuit is provided to loop-back the data on the receiving end to the transmitting end when making the loop test.

Next, a description will be given of the receiving system of the modem unit.

The frequency modulated data received from the line is subjected to a predetermined signal processing if necessary and is input to the decimation unit 41 of the modem unit. For example, the predetermined signal processing in the receiving system is carried out in known circuits which carry out an analog-to-digital (A/D) conversion, loop test, frequency characteristic compensation or the like. The loop test circuit is provided to loop back the data on the transmitting end to the receiving end when making the loop test. The frequency characteristic compensation circuit is provided to compensate for the frequency characteristic deterioration caused by the line.

In order to reduce the amount of the computation process, the decimation unit 41 converts the sampling frequency from 14.4 kHz to 7.2 kHz. In addition, the demodulation circuit 42 frequency-demodulates the received frequency modulated data using each carrier frequency from the carrier input circuit 43. In other words, the passband signal (scalar signal) obtained from the decimation unit 41 is converted into a baseband signal (vector signal). Furthermore, the roll-off filter 44 eliminates the unwanted signal outside the band from the baseband signal. An output of this roll-off filter 44 is input to the difference circuit 45 and the carrier detection circuit 46.

Figure 12:
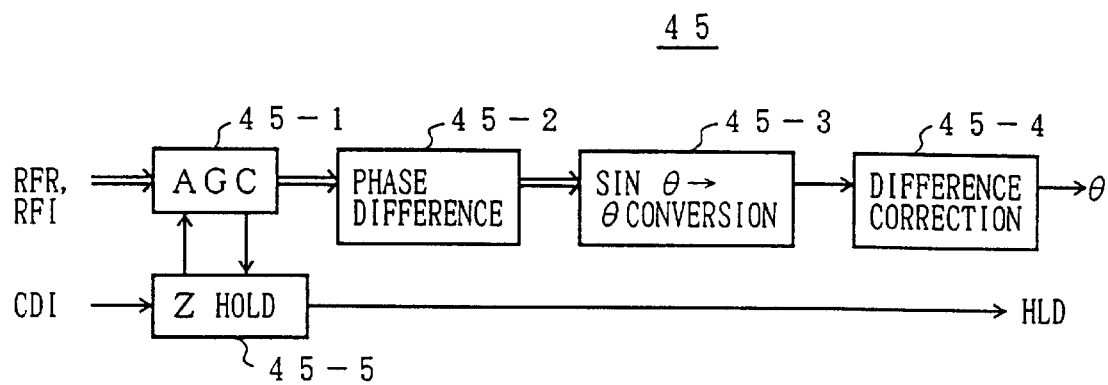
FIG. 12 is a block diagram showing the general construction of a phase shift quantity obtaining circuit.

FIG. 12 is a block diagram showing the general construction of the difference circuit 45. The difference circuit 45 includes an automatic gain control (AGC) circuit 45-1, a phase difference circuit 45-2, a conversion circuit 45-3, a difference correction circuit 45-4 and a Z hold circuit 45-5 which are connected as shown in FIG. 12.

The AGC circuit 45-1 is provided to normalize the signal into a signal on a unit circumference (radius 1), so as to calculate the phase difference for each vector signal. Hence, the level of the output RFR, RFI of the roll-off filter 44 is adjusted to 0 dB±6.0 dB, for example, by the AGC circuit 45-1, and normalized vector signals $\cos\theta$ and $\sin\theta$ are input to the phase difference circuit 45-2.

The phase difference circuit 45-2 calculates the phase difference from the following trigonometric function formulas based on the normalized vector signals $\cos\theta$ and $\sin\theta$.

$$\cos(\Delta^\theta) = \cos(\theta_n - \theta_{n-1})$$
$$= \cos\theta_n\cos\theta_{n-1} + \sin\theta_n\sin\theta_{n-1}$$
$$\sin(\Delta^\theta) = \sin(\theta_n - \theta_{n-1})$$
$$= \sin\theta_n\cos\theta_{n-1} - \cos\theta_n\sin\theta_{n-1}$$

Figure 13:
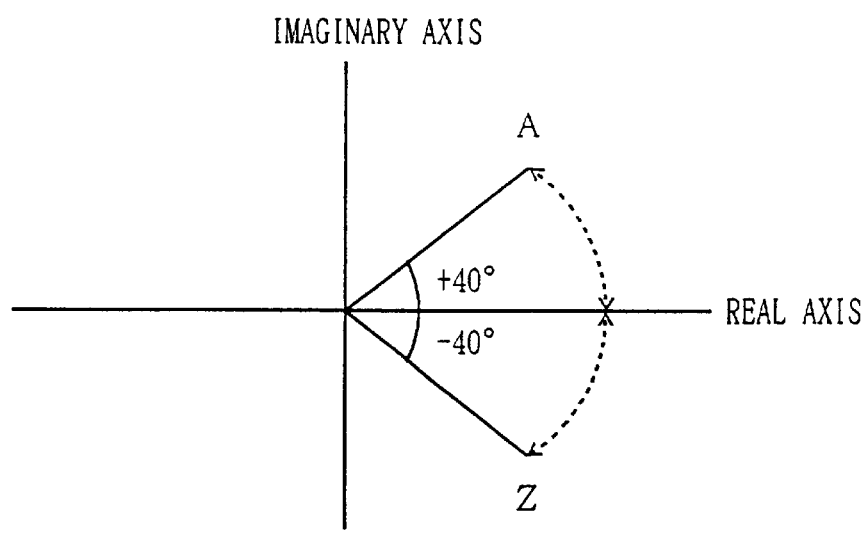
FIG. 13 is a diagram showing an output phase difference of the frequency change obtaining circuit of FIG. 12.

For example, in the case of the fourth mode in which the maximum transmission rate is 1200 bps, the frequency shift of the data A from the center carrier is +400 Hz and the shift angle (phase shift quantity) at the sampling interval of 3.6 kHz is +40°. On the other hand, the frequency shift of the data Z is −400 Hz and the shift angle (phase shift quantity) at the sampling interval of 3.6 kHz is −40°. Accordingly, the output phase difference of the phase difference circuit 45-2 for this case becomes as shown in FIG. 13.

The conversion circuit 45-3 converts the phase difference which is obtained from the phase difference circuit 45-2 and is described by the vector representation into a phase angle (phase shift quantity) θ. In other words, because the error is large if the vector signals $\sin\theta$ and $\cos\theta$ are used as they are, the conversion circuit 45-3 converts the vector signals into the phase shift quantity θ. When making this conversion, the terms up to the second order of the Taylor expansion formula are obtained, and the phase shift quantity θ is calculated from the following formulas.

$$\cos\theta = 1 - \theta^2/2,$$

and thus, $$\theta^2 = 2(1 - \cos\theta)$$

$$\sin\theta = \theta - \theta^3/6,$$

and thus, $$\theta = \sin\theta/(1 - \theta^2/6)$$
$$= \sin\theta/\{(2/3) + (\cos\theta/3)\}$$

The phase shift quantity θ output from the conversion circuit 45-3 is described by (shift angle)/(sample)= ((frequency shift)±Δf)/(sampling frequency)×2π, and the value thereof differs depending on the mode, that is, the maximum transmission rate. In other words, in the first mode in which the maximum transmission rate is 200 bps and in the second mode in which the maximum transmission rate is 300 bps, the sampling frequency is 3.6 kHz, the frequency shift ±Δf is ±100 Hz, and the phase shift quantity θ is 0.174532925 radians or 10°. In the third mode in which the maximum transmission rate is 600 bps, the sampling frequency is 3.6 kHz, the frequency shift ±Δf is ±200 Hz, and the phase shift quantity θ is 0.34906585 radians or 20°. In addition, in the fourth mode in which the maximum transmission rate is 1200 bps, the sampling frequency is 3.6 kHz, the frequency shift ±Δf is ±400 Hz, and the phase shift quantity θ is 0.698131700 radians or 40°. Hence, in order to make a common judgement for each of the four modes in the judging circuit 48 which is provided at a subsequent stage, the difference correction circuit 45-4 multiplies the phase shift quantities e of the first and second modes by 4, and multiplies the phase shift quantity θ of the third mode by 2, so as to match the phase shift quantities θ of the first through third modes to the phase shift quantity θ of the fourth mode.

On the other hand, the carrier detection circuit 46 detects the carrier from the output RFR, RFI of the roll-off filter 44, and a carrier detection signal CDI which indicates the ON/OFF state of the carrier. This carrier detection signal CDI is input to the Z hold circuit 45-5 within the difference circuit 45. In addition, the carrier detection circuit 46 outputs a detected carrier CD with respect to the MPU 11 and the host unit.

Figure 14:
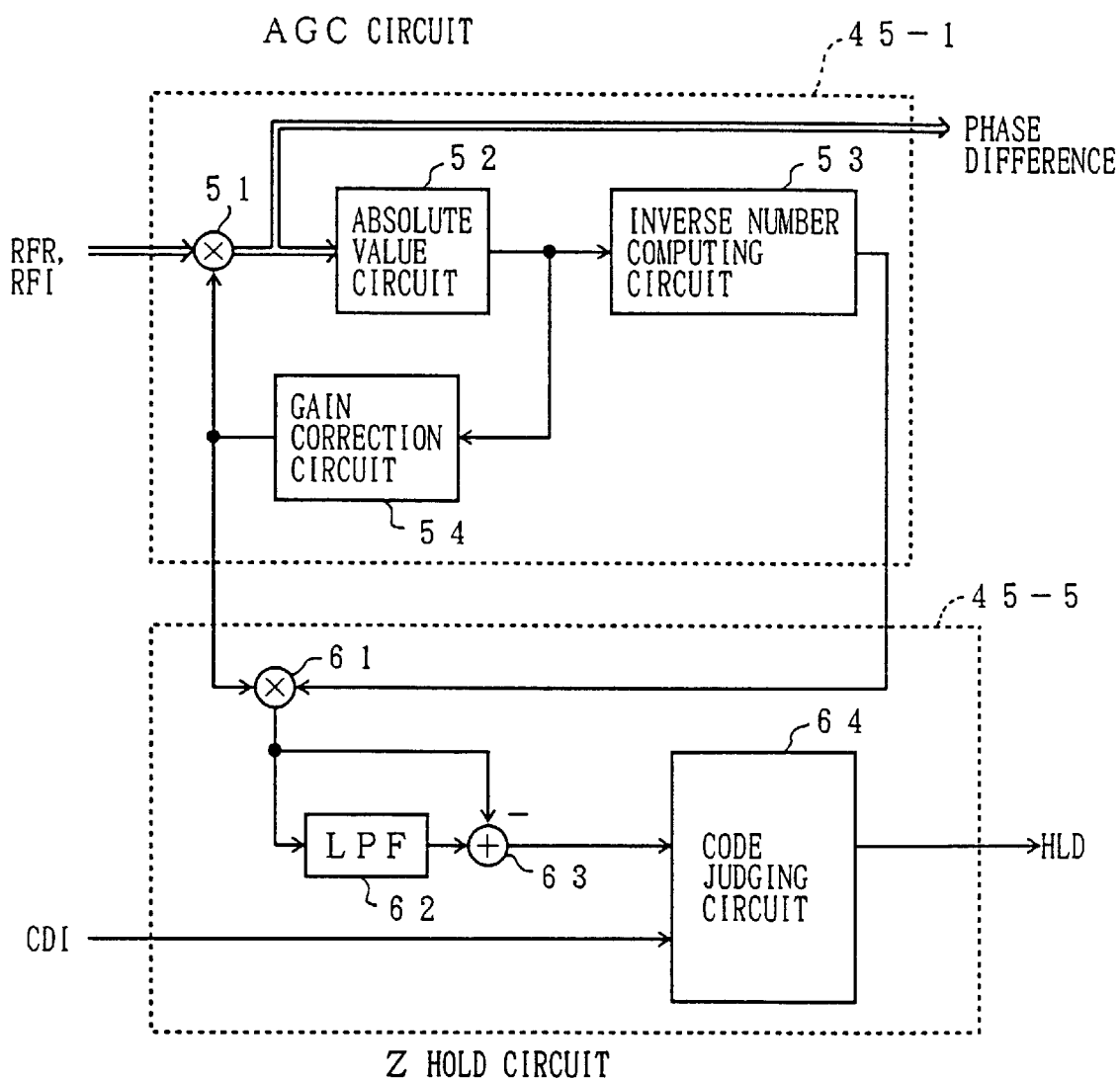
FIG. 14 is a system block diagram showing the construction of an automatic gain control (AGC) circuit and a Z hold circuit of the frequency change obtaining circuit of FIG. 12.

FIG. 14 is a block diagram showing the construction of the AGC circuit 45-1 and the Z hold circuit 45-5. In FIG. 14, the AGC circuit 45-1 includes a multiplying circuit 51, an absolute value circuit 52, an inverse number computing circuit 53 and a gain correction circuit 54 which are connected as shown. On the other hand, the Z hold circuit 45-5 includes a multiplying circuit 61, a lowpass filter (LPF) 62, a subtracting circuit 63 and a code judging circuit 64 which are connected as shown.

The output RFR, RFI of the roll-off filter 44 is multiplied by a gain G in the multiplying circuit 51 within the AGC circuit 45-1, and the normalized vector signals cos θ and sin θ are input to the phase difference circuit 45-2. In addition, the absolute value circuit 52 and the inverse number computing circuit 53 compute the inverse number of the absolute value of the normalized vectors cos θ and sinO, and input the computed inverse number to the multiplying circuit 61 within the Z hold circuit 45-5. Furthermore, the absolute value computed by the absolute value circuit 52 is input to the gain correction circuit 54 which corrects the gain G based on the difference between the absolute value and a reference level. The corrected gain G is input to the multiplying circuit 51 and to the multiplying circuit 61 within the Z hold circuit 45-5.

When the carrier is OFF, the signal waveform becomes distorted by the transient phenomenon, and the so-called unwanted or trash data, which is a kind of noise, is generated. Hence, in order to prevent undesirable effects of the trash data with respect to the external unit such as the host unit, the data is held to Z (hereinafter referred to as "Z hold") when the carrier is OFF. The Z hold circuit 45-5 is provided to carry out this Z hold when the carrier is OFF.

An output of the multiplying circuit 61 of the Z hold circuit 45-5 is input to the input side of the LPF 62 on one hand, and is input to the subtracting circuit 63 which is provided on the output side of the LPF 62 on the other. The subtracting circuit 63 subtracts the output of the multiplying circuit 61 from an output of the LPF 62, and inputs a subtraction result to the code judging circuit 64. This code judging circuit 64 also receives the carrier detection signal CDI from the carrier detection circuit 46.

When the carrier is ON, the multiplication result of the gain G and the inverse number obtained by the multiplying circuit 61 is 1, and the difference between the signals before and after passing the LPF 62 becomes 0. On the other hand, when the carrier is OFF, the signal level rapidly decreases, and the inverse number becomes 1 or greater. For this reason, when the carrier is OFF, the multiplication result of the gain G and the inverse number in the multiplying circuit 61 is 1 or greater, and the difference between the signals before and after passing the LPF 62 becomes a negative value. Accordingly, the code judging circuit 64 outputs a hold signal HLD when the signal difference obtained by the subtracting circuit 63 has a negative value, and makes the Z hold with respect to the received data. Since the Z hold is made after the carrier becomes OFF, the code judging circuit 64 actually outputs the hold signal HLD by obtaining a logical product of the hold signal HLD and the carrier detection signal CDI from the carrier detection circuit 46. Therefore, the Z hold circuit 45-5 can make the Z hold instantaneously when the carrier becomes OFF.

The phase shift quantity 0 output from the difference circuit 45 and the hold signal HLD are input to the judging circuit 48 via the interpolator 47 shown in FIG. 2. The interpolator 47 converts the sampling frequency of the phase shift quantity θ from 7.2 kHz to 28.8 kHz in order to reduce the jitter of the received data. The judging circuit 48 judges whether the received data is A or Z by judging the polarity of the scalar signal which is received via the interpolator 47. The judging circuit 48 outputs a judgement result indicating the binary data 0(A) or 1(Z) with respect to the MPU 11 and the host unit.

The scalar signal input to the judging circuit 48 is A or Z and is ±0.698131700, that is, a positive value if A, and a negative value if Z. In addition, when a transition takes place between A and Z, the scalar signal changes from a positive value to a negative value if a transition from A to Z occurs, and changes from a negative value to a positive value if a transition from Z to A occurs. Hence, the judging circuit 48 judges the received data by detecting the transition between A and Z.

Figure 15:
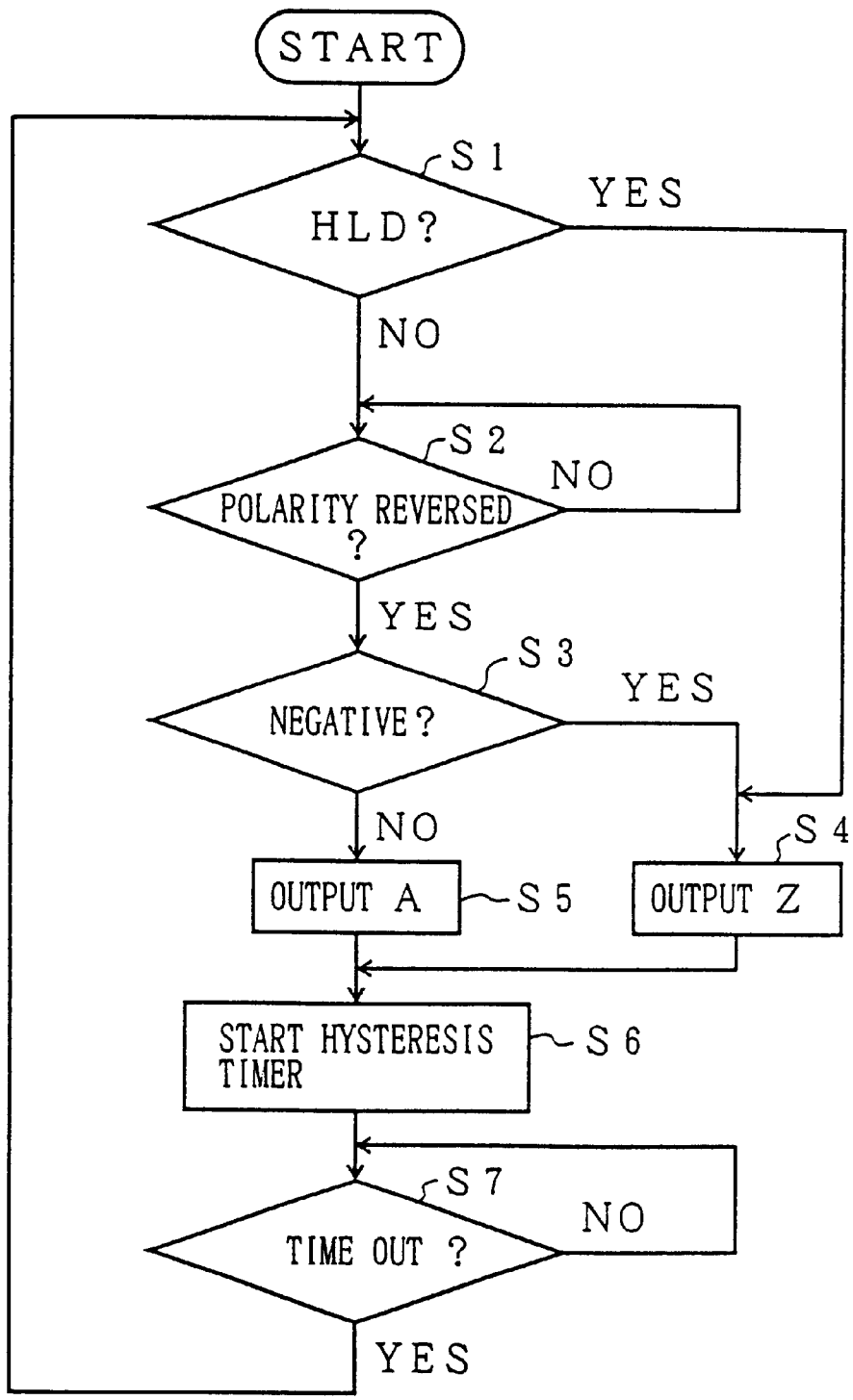
FIG. 15 is a flow chart for explaining the operation of a judging circuit of the modem unit of the invention.

FIG. 15 is a flow chart for explaining the operation of the judging circuit 48. In FIG. 15, a step S1 decides whether or not the hold signal HLD from the Z hold circuit 45-5 within the difference circuit 45 is input. If the decision result in the step S1 is YES, the process advances to a step S4 which will be described later and the Z hold is carried out. On the other hand, if the decision result in the step S1 is NO, a step S2 decides whether or not the polarity of the input scalar signal reversed. The step S2 is repeated until the decision result becomes YES, and when the decision result becomes YES, a step S3 decides whether or not the polarity of the scalar signal reversed to negative. The process advances to the step S4 if the decision result in the step S3 is YES, and the process advances to a step S5 if the decision result in the step S3 is NO.

The step S4 judges that the received data is Z and outputs the data Z, and the process advances to a step S6. In addition, the step S5 judges that the received data is A and outputs the data A, and the process advances to the step S6. The step S6 starts a hysteresis timer, and a step S7 decides whether or not a time-out of the hysteresis timer occurred. The step S7 is repeated until the decision result becomes YES, and when the decision result becomes YES, the process returns to the step S1.

The steps S6 and S7 are provided in order to prevent chattering at the time of judging the received data when the polarity of the scalar signal is reversed, and hold the judgment result of the step S4 or S5 for a predetermined holding time which is managed by the hysteresis timer after the step S4 or S5 outputs the judgment result regarding the received data. In this case, the predetermined holding time is set to approximately 25±5% of the maximum transmission rate in each mode. For example, if the predetermined holding time is set to 25% of the maximum transmission rate, that is, a time of approximately ¼ 1 bit, the predetermined holding time is 1.25 ms in the first mode, 0.83 ms in the second mode, 0.42 ms in the third mode, and 0.21 ms in the fourth mode.

FIG. 16 is a time chart for explaining the operation of the judging circuit 48. In FIG. 16, (a) indicates the judgment result regarding the received data in the step S4 or S5 described above, (b) indicates the operation state of the hysteresis timer, (c) indicates the judgement output supervision by the steps S6 an S7 described above, and (d) indicates the output signal finally output from the judging circuit 48, that is, the data 0(A) and 1(Z).

In the demodulation circuit 42 provided at the stage preceding the judging circuit 48, the demodulation is carried out at the center frequency of A and Z. For this reason, the judging circuit 48 can always judge the received data A and Z at the intermediate point of the phase shift by judging the polarity. As a result, it is possible to obtain received data having small code error.

Further, the present invention is not limited to the above described embodiments, but various variations and modifications may be made without departing from the scope of the present invention.

What is claimed is:

1. A frequency modulation method comprising:
   a first filtering step limiting input data to a frequency band which is dependent on a maximum transmission rate to avoid effects of an aliasing component;
   a frequency-shifting step subjecting said input data, limited by said first filtering step, to a frequency shift corresponding to a binary data value;
   a second filtering step limiting an output obtained by said frequency-shifting step to a common frequency band, using a single common bandpass filter regardless of a number of carrier frequencies and performing baseband processing based on a code error and an aliasing noise outside the frequency band; and
   a modulation step frequency-modulating an output obtained by said second filtering step by a carrier frequency having an intermediate value of frequencies respectively corresponding to binary data values.

2. The frequency modulation method as claimed in claim 1, wherein said frequency-shifting step subjects the input data to the frequency shift with a frequency shift with a frequency shift quantity corresponding to a data transmission rate.

3. The frequency modulation method as claimed in claim 1, wherein said second filtering step limits an unwanted band corresponding to a data transmission rate.

4. The frequency modulation method as claimed in claim 2, wherein said second filtering step limits an unwanted band corresponding to a data transmission rate.

5. The frequency modulation method as claimed in claim 1, and further comprising:
   a step for automatically setting parameters used in at least said frequency-shifting step and said second filtering step depending on a data transmission rate.

6. The method as in claim 1, wherein said single common bandpass filter has at least one of the following characteristics:
   1. a flat frequency characteristic up to a frequency shift of 100 $H_z$ and higher,
   2. a flat band up to 20 $\log_{10} 0.15$ on the transmitting data spectrum, code error not exceeding 15%,
   3. no energy to the adjacent channel,
   4. a useful signal to noise ratio provided outside the band, and
   5. aliasing outside the band is a design factor.

7. A modem unit comprising:
   first filtering means for limiting input data to a frequency band which is dependent on a maximum transmission rate to avoid effects of an aliasing component outside the frequency band;
   frequency-shifting means for subjecting an input data to a frequency shift corresponding to a binary data value;
   second filtering means, including a single common bandpass filter regardless of a number of carrier frequencies, for limiting an output obtained by said frequency-shifting means to a common frequency band for baseband processing by considering a code error and an aliasing noise outside of the frequency band; and
   modulation means for frequency-modulating an output obtained by said second filtering means by a carrier frequency having an intermediate value of frequencies respectively corresponding to binary data values.

8. The modem unit as claimed in claim 7, wherein said frequency-shifting means subjects the input data to the frequency shift with a frequency shift quantity corresponding to a data transmission rate.

9. The modem unit as claimed in claim 7, wherein said second filtering means limits an unwanted band corresponding to a data transmission rate.

10. The modem unit as claimed in claim 8, wherein said second filtering means limits an unwanted band corresponding to a data transmission rate.

11. The modem unit as claimed in claim 7, and further comprising:
    means for automatically setting parameters used in at least said frequency-shifting means and said second filtering means depending on a data transmission rate.

12. A modem unit as in claim 7, wherein said single common bandpass filter has at least one of the following characteristics:
    1. a flat frequency characteristic up to a frequency shift of 100 $H_z$ and higher,
    2. a flat band up to $20\log_{10} 0.15$ on the transmitting data spectrum, code error not exceeding 15%,
    3. no energy to the adjacent channel,
    4. a useful signal to noise ratio provided outside the band and
    5. aliasing outside the band is a design factor.

13. A frequency modulation method comprising:
    first filtering step limiting input data to a frequency band which is dependent on a maximum transmission rate to avoid effects of an aliasing component;
    frequency-shifting step subjecting said inout data, limited by said first filtering step, to a frequency shift corresponding to a binary data value;
    a second filtering step limiting an output obtained by said frequency-shifting step to a common frequency band, using a single common bandpass filter regardless of a number of carrier frequencies, and performing baseband processing based on a code error and an aliasing noise outside the frequency band; and
    a modulation means for frequency-modulating an output obtained by said second filtering means by a carrier frequency having an intermediate value of frequencies respectively corresponding to binary data values,
    said frequency-shifting means having an input for indicating a phase-shift quantity, said input being determined by a plurality of predetermined modes.

14. The method as in claim 13, wherein said single common bandpass filter has at least one of the following characteristics:
    1. a flat frequency characteristic up to a frequency shift of 100 $H_z$ and higher,
    2. a flat band up to 20 $\log_{10} 0.15$ on the transmitting data spectrum, code error not exceeding 15%, 3. no energy to the adjacent channel,
4. a useful signal to noise ratio provided outside the band, and
5. aliasing outside the band is a design factor.

15. A modem unit comprising:

first filtering means for limiting input data to a frequency band which is dependent on a maximum transmission rate to avoid effects of an aliasing component;

frequency-shifting means for subjecting an input data, to a frequency shift corresponding to a binary data value;

second filtering means including a single common bandpass filter regardless of a number of carrier frequencies, for limiting an output obtained by said frequency-shifting means to a common frequency band for baseband processing by considering a code error and an aliasing noise outside the frequency band; and modulation means for frequency-modulating an out put obtained by said second filtering step by a carrier frequency having an intermediate value of frequencies respectively corresponding to binary data values, said frequency-shifting means having an input for indicating a phase shifting quantity, said input being determined by a plurality of predetermined modes.

16. A modem unit as in claim 15, wherein said single common bandpass filter has at least one of the following characteristics:

1. a flat frequency characteristic up to a frequency shift of 100 $H_z$ and higher,
2. a flat band up to 20 $\log_{10} 0.15$ on the transmitting data spectrum, code error not exceeding 15%,
3. no energy to the adjacent channel,
4. a useful signal to noise ratio provided outside the band, and
5. aliasing outside the band is a design factor.

17. A frequency modulation method comprising:

a first filtering step limiting input data to a frequency band which is dependent on a maximum transmission rate;

a frequency-shifting step subjecting said input data, limited by said first filtering step, to a frequency shift corresponding to a binary data value;

a second filtering step limiting an output obtained by said frequency-shifting step to a common frequency band using a single common bandpass filter regardless of a number of carrier frequencies; and a modulation step limiting an output obtained by said second filtering step means by a carrier frequency having an intermediate value of frequencies respectively corresponding to binary data values, said frequency-shifting step having an input for indicating a phase-shifting quantity, said input being determined by a plurality of predetermined modes.

18. The method as in claims 17 wherein said single common bandpass filter has at least one of the following characteristics:

1. a flat frequency characteristic up to a frequency shift of 100 $H_z$ and higher,
2. a flat band up to 20 $\log_{10}^{0.15}$ on the transmitting data spectrum, code error not exceeding 15%,
4. no energy to the adjacent channel,
4. a useful signal to noise ratio provided outside the band, and
5. aliasing outside the band is a design factor.

19. A modem unit comprising:

a first filtering means for limiting input data to a frequency band which is dependent on a maximum transmission rate;

frequency-shifting means for subjecting an input data to a frequency shift corresponding to a binary data value;

second filtering means, including a single common bandpass filter regardless of a number of carrier frequencies, for limiting an input obtained by said frequency-shifting means to a common frequency band; and modulation means for frequency-modulating an input obtained by said second filtering means by a carrier frequency having an intermediate value of frequencies respectively corresponding to a binary data values, said frequency-shifting means having an input for indicating a phase shifting quantity, said input being undetermined by a plurality of predetermined modes.

20. A modem unit as in claim 19, wherein said single common bandpass filter has at least one of the following characteristics:

1. a flat frequency characteristic up to a frequency shift of 100 $H_z$ and higher,
2. a flat band up to 20 $\log_{10} 0.15$ on the transmitting data spectrum, code error not exceeding 15%,
3. no energy to the adjacent channel,
4. a useful signal to noise ratio provided outside the band, and
5. aliasing outside the band is a design factor.

* * * * *